United States Patent [19]

Marcie et al.

[11] Patent Number: 4,924,054

[45] Date of Patent: May 8, 1990

[54] ELECTRICAL RESISTANCE BRAZING DEVICE

[75] Inventors: Mark J. Marcie, Walled Lake; John P. Williams, Jr., Redford, both of Mich.

[73] Assignee: Daykin Electric Corporation, Livonia, Mich.

[21] Appl. No.: 285,504

[22] Filed: Dec. 16, 1988

[51] Int. Cl.$^5$ .......................... B23K 1/04; B21V 5/08
[52] U.S. Cl. .............................. 219/85.14; 219/150 R
[58] Field of Search ............. 219/85.14, 85.15, 150 R

[56] References Cited

U.S. PATENT DOCUMENTS

| | | | |
|---|---|---|---|
| 3,728,887 | 4/1973 | Bachmann | 219/150 R X |
| 4,051,667 | 10/1977 | Lange | 219/51 X |
| 4,404,458 | 9/1983 | Tange | 219/104 X |

*Primary Examiner*—George H. Miller, Jr.
*Attorney, Agent, or Firm*—Barnes, Kisselle, Raisch, Choate, Whittemore & Hulbert

[57] ABSTRACT

Apparatus for heating a tube/sleeve end fitting for brazing comprises an opposed pair of electrodes having arcuate electrode surfaces contoured for external peripheral engagement with a tube/sleeve end fitting, with one part of the electrode surface in engagement with the fitting sleeve and the other part of electrode surface in engagement with the tube closely adjacent to but spaced from the sleeve. A power transformer has a primary winding connected for selective application of current thereto, and a secondary winding consisting of the electrodes for selective application of heating current to an end fitting clamped between the electrodes for electrical resistance heating thereof. Timers control application of heating current to the end fitting for one or more operator-selectable predetermined timed durations.

12 Claims, 3 Drawing Sheets

ELECTRICAL RESISTANCE BRAZING DEVICE

The present invention is directed to electrical resistance heating equipment, and more particularly to an apparatus for heating a tube and end fitting for brazing.

BACKGROUND AND OBJECTS OF THE INVENTION

It is conventional practice in installation of electrical and plumbing conduits to terminate the conduit pipe or tube in a fitting of a union or other coupling device. The fitting typically comprises a collar or sleeve brazed onto the tube end and having a periphery contoured to be sealingly captured between coupling members. It is critical in brazing the collar onto the tube end that they be heated in a controlled and uniform manner so as to obtain proper flow, distribution and metalurgy of the brazing alloy.

Conventionally, the tube end and sleeve are heated by manipulation of a specially-contoured brazing torch. The process is thus dependent upon training and dexterity of the technician, and results are not always satisfactory. Heat control and distribution remain a limiting factor in construction of satisfactory brazed tube/sleeve end fittings, particularly where brazed in the field under adverse working conditions.

It is therefore a general object of the present invention to provide apparatus for heating a tube/sleeve end fitting for brazing that obtains controlled and uniform heat distribution around the fitting components, requires minimum operator intervention and skill, is quick and easy to use, avoids the fire and, explosion hazards of an open flame, is economical to assemble and sufficiently portable as to be readily transportable to a job site, is constructed to accommodate a variety of tube and sleeve diameters, of economical manufacture and assembly and provides reliable service over an extended operating lifetime.

SUMMARY OF THE INVENTION

The foregoing and other objects are obtained in accordance with a presently preferred embodiment of the invention in which apparatus for heating a tube/sleeve end fitting for brazing comprises a pair of electrodes mounted for physical engagement with a tube/sleeve end fitting, with one of the electrodes in engagement with the fitting sleeve and the other of the electrodes in engagement with the tube closely adjacent to but spaced from the sleeve. Preferably, the electrodes comprise an opposed pair of electrode elements having arcuate electrode surfaces contoured for external peripheral engagement with the pipe and sleeve. The electrodes most preferably take the form of opposed U-shaped members, with one end of each member corresponding to one of the electrode elements. A power transformer has a primary winding connected for selective application of current thereto, and a secondary winding consisting of the electrodes for selective application of heating current to an end fitting clamped between the electrodes for electrical resistance heating thereof. Timers control application of heating current to the end fitting for one or more operator-selectable predetermined timed durations.

In the preferred embodiment of the invention, inserts are removably carried by the electrode elements and have surface portions contoured for abutting peripheral engagement with the end fitting components, so that the apparatus of the invention may be employed in conjunction with components of differing diameters by replacement of the electrode inserts. At least one electrode of each pair is movable with respect to the other and is associated with a locking element, such as a toggle clamp, for locking the electrodes in clamped abutting engagement with the end fitting components. Preferably, the entire apparatus, including the electrodes, is carried by a wheeled cabinet that may be readily transported to and about a job site.

BRIEF DESCRIPTION OF THE DRAWINGS

The invention, together with these and additional objects, features and advantages thereof, will be best understood from the following description, the appended claims and the accompanying drawings in which:

DETAILED DESCRIPTION OF PREFERRED EMBODIMENT

Figure 1:
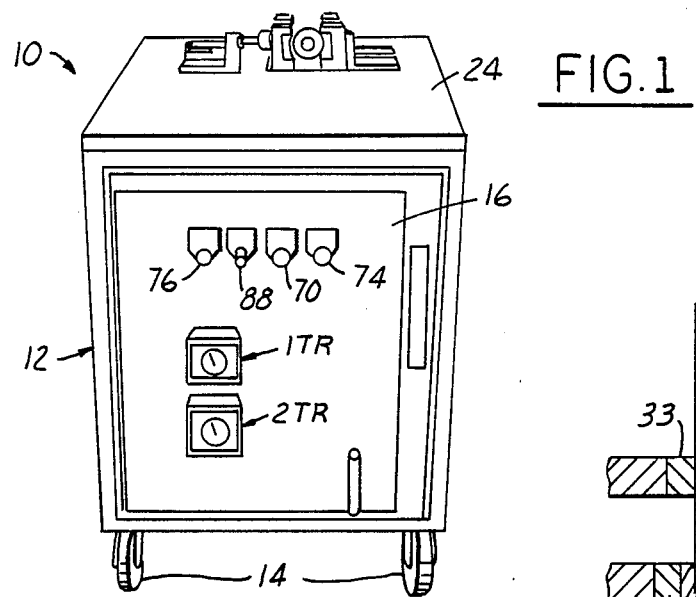
FIG. 1 is a front perspective view of apparatus for heating a tube/sleeve end fitting in accordance with a presently preferred embodiment of the invention.
Figure 4:
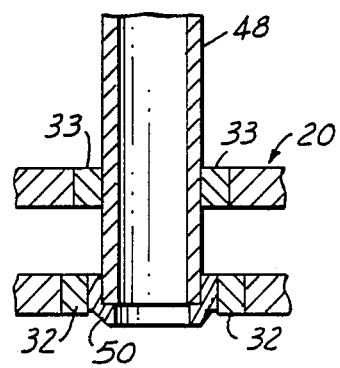
FIGS. 4 and 5 are sectional views taken substantially along the respective lines 4—4 and 5—5 in FIG. 2.
Figure 5:
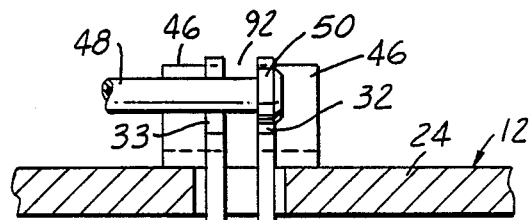

The drawings illustrate apparatus 10 for heating a tube/sleeve end fitting for brazing in accordance with a presently preferred embodiment of the invention as comprising a generally rectangular enclosure or cabinet 12 movably mounted on a plurality of support casters 14. The front panel 16 of cabinet 12 comprises a hinged operator panel that may be opened to reveal apparatus components contained within the cabinet. A pair of generally U-shaped electrode elements 18, 20 are mounted on a pivot 22 (FIG. 2) within cabinet 12 and extend upwardly therefrom so that the free ends of the electrode elements are positioned above the upper panel 24 of cabinet 12, as best seen in FIG. 1. The bases or bights of electrode elements 18, 20 adjacent to pivot 22 are enlarged, as best is seen FIG. 5, and enclose an electrical winding 26. A laminated iron core 28 surrounds winding 26 and the bases of electrode elements 18, 20 so as to form a power transformer 30 in which winding 26 forms the primary transformer winding and electrode elements 18, 20 form secondary windings.

Figure 3:
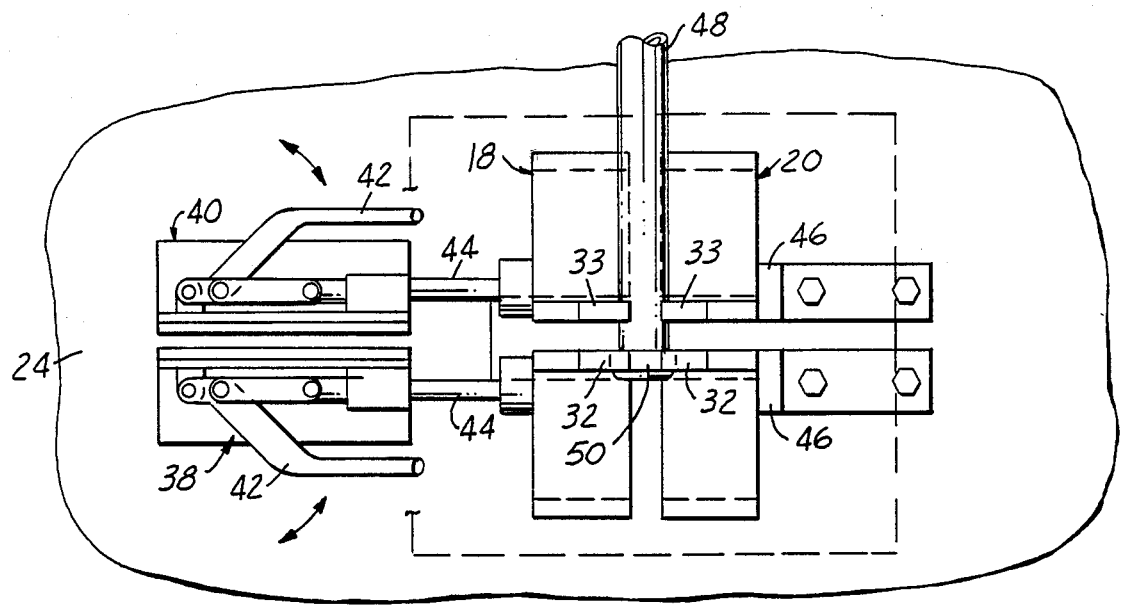
FIG. 3 is a top plan view of the heating electrodes in FIG. 1 clamped in engagement with a tube/sleeve end fitting.

Above cabinet top panel 24, inserts 32, 33 are removably mounted by locator pins 34 at the forward free end of the arms. Each insert 32, 33 has an arcuate contact surface 36 of radius suitable for embracing abutting engagement with a pipe or sleeve of predetermined diameter. As best seen in FIG. 3, inserts 32 are carried by one set of the free ends of electrode arms 18, 20 in lateral opposition to each other, and, inserts 33 are carried by the other set of electrode arms in lateral opposition to each other. The inserts 32, 33 on the free ends of each electrode thus have contact surfaces 36 of differing radii, coordinated with outside diameters of the sleeve and tube respectively. These radii, for each electrode, are centered on a common axis. The surfaces 36 of laterally opposed electrode free ends are mirror images of each other.

Figure 2:
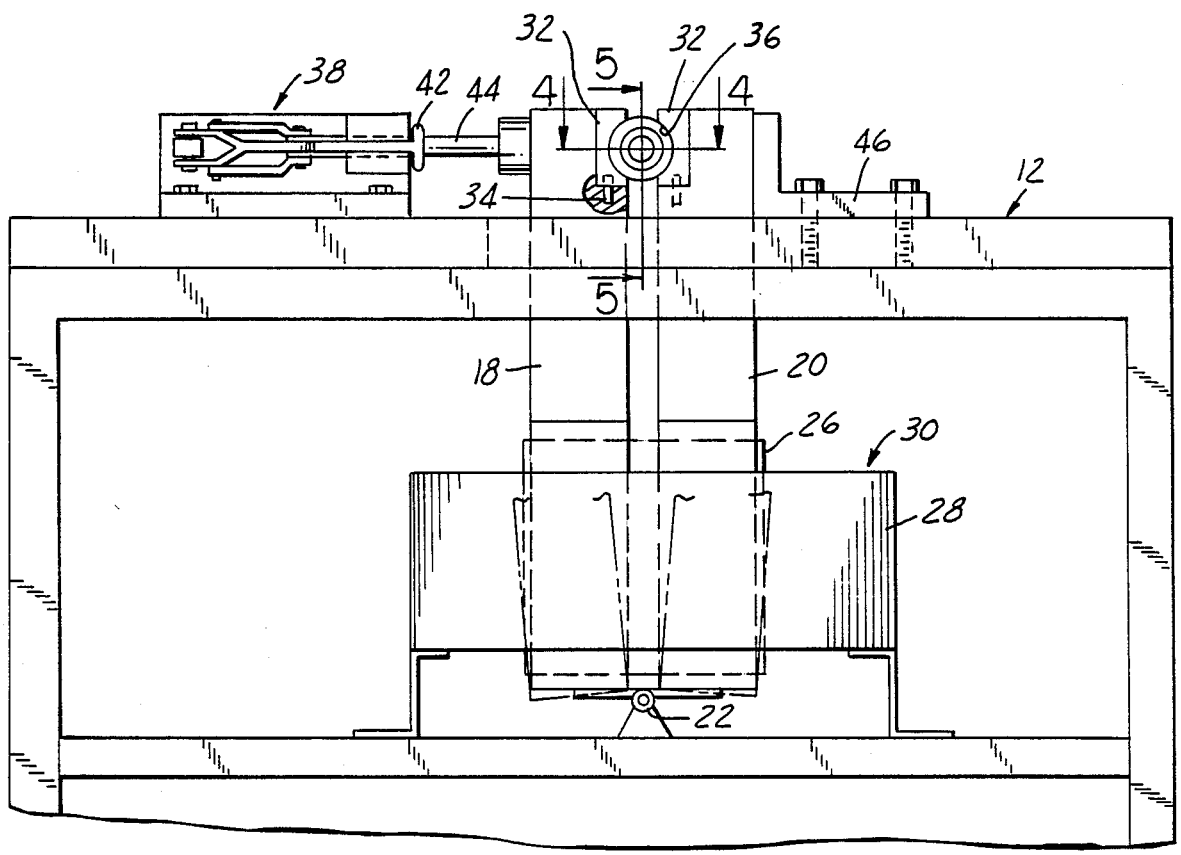
FIG. 2 is a fragmentary front elevational view of the apparatus in FIG. 1 with its front control panel open.

A pair of toggle clamps 38, 40 are carried by enclosure panel 24 laterally outwardly adjacent to the free ends of electrode element 18. Each toggle clamp 38, 40 has a clamp handle 42 and an insulated clamp head 44 positioned to laterally engage an associated free end of electrode 18. The free ends of electrode 20 are positioned adjacent to stop elements 46 affixed to enclosure panel 24. In the open positions (not shown) of clamps 38, 40, electrode 18 is free to swing about pivot 22 away from electrode 20, which is held against such lateral motion by stops 46. An unbrazed end fitting may then be placed between the electrodes, with sleeve 50 abutting insert surface 36 on insert 32 of electrode 20, and with tube 48 abutting the arcuate surface of insert 33 of electrode 20. As toggle clamps 38, 40 are closed, electrode 18 is swung about pivot 22 so that the tube and sleeve are clamped between the electrodes, with all insert contact surfaces 36 in peripheral engagement with the opposed tube and sleeve surfaces. As best seen in FIG. 2, such surface contact extends over and embraces a substantial portion of the sleeve and tube outside diameters.

Figure 6:
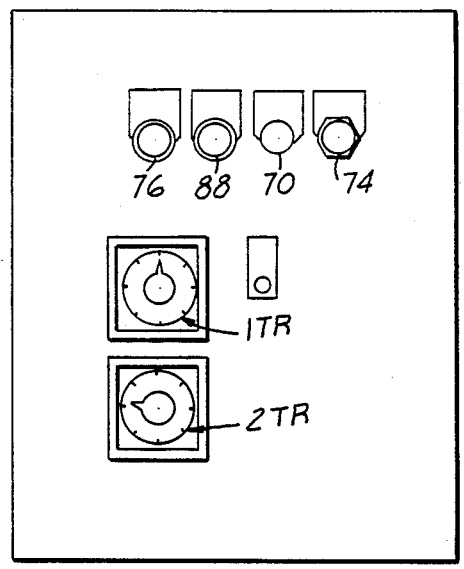
FIG. 6 is a front elevational view of the operator control panel of the apparatus of FIG. 1.
Figure 7:
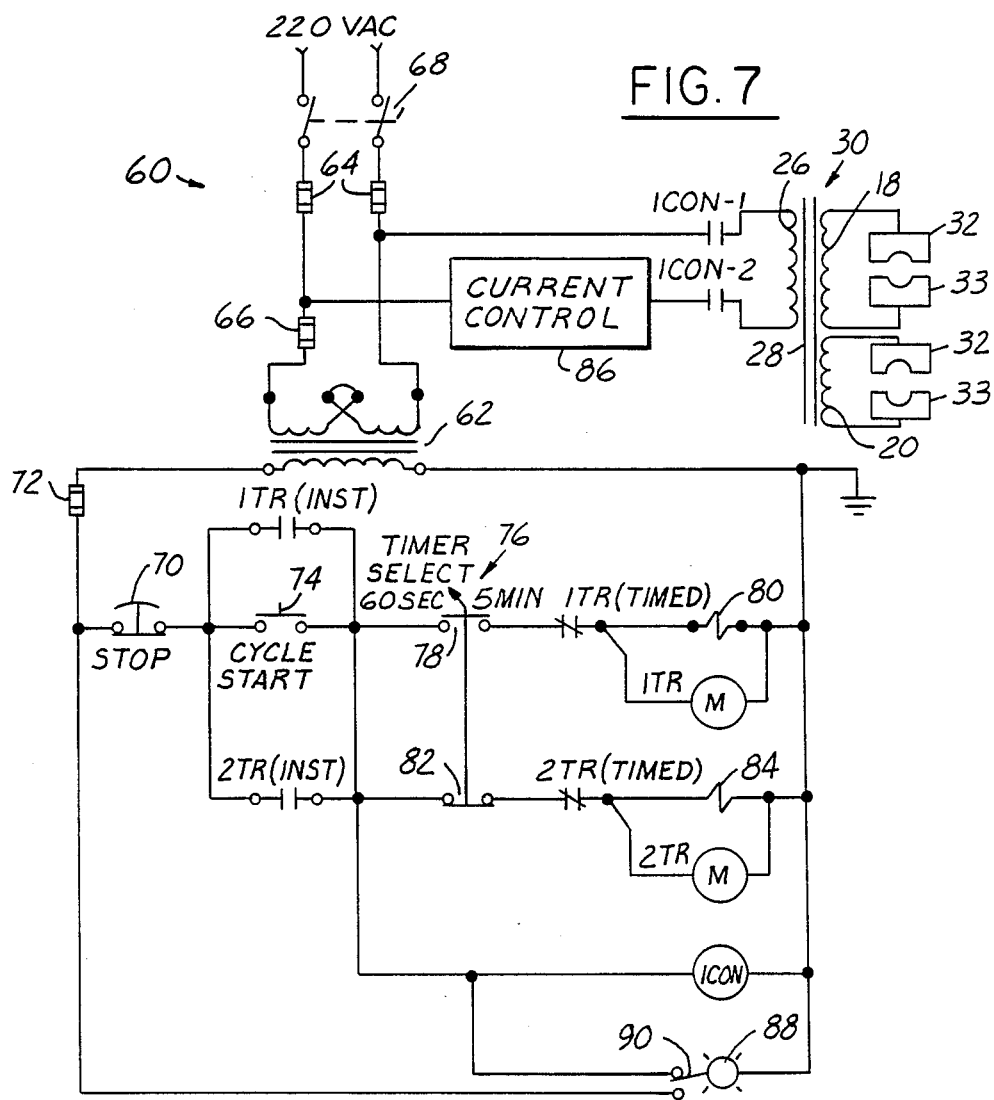
FIG. 7 is a schematic diagram of the apparatus control electronics.

Referring to FIGS. 6 and 7, apparatus control circuitry 60 in accordance with a presently preferred embodiment of the invention includes a transformer 62 having primary windings connected through fuses 64, 66 and through a disconnect switch 68 to a power cord or the like for application of 220VAC utility power. An emergency stop palm button 70 is connected through a fuse 72 across the secondary of transformer 62 in series with a start-cycle operator pushbutton 74. A toggle switch 76 has a first pair of contacts 78 connected in series with normally closed contacts 1TR (timed) and a clutch 80 associated with a motorized timer 1TR. A second pair of contacts 82 in switch 76 is in series with normally-closed contacts 2TR (timed) and a clutch 84 associated with a second motorized timer 2TR. Each timer 1TR and 2TR has associated normally-open contacts 1TR (inst.) and 2TR (inst.) connected in parallel with start cycle switch 74. A control relay 1CON is connected in series with switches 70, 74 across the secondary transformer 62, and has normally open contacts 1CON-1 and 1CON-2 for applying electrical power from disconnect 68 through a current-control power supply 86 to primary winding 26 of power transformer 30. A switch 90 has contacts for selective connection of a lamp 88 across the coil of control relay 1CON or across the secondary of transformer 62. Palm button 70, pushbutton 74, toggle switch 76 and lamp 88 are mounted on operator panel 16, as are dial indicators associated with motorized times 1TR and 2TR.

Figure 8:
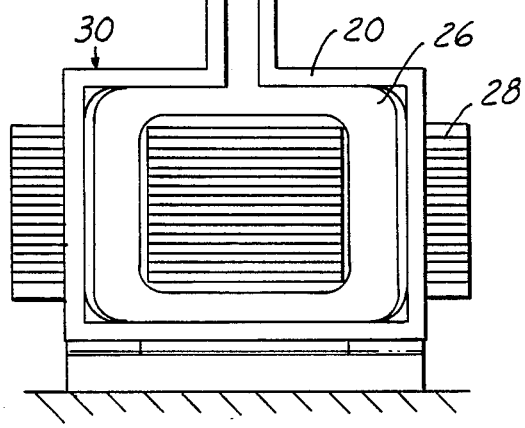
FIG. 8 is a partially sectioned fragmentary elevational view of a tube/sleeve end fitting.
Figure 8:
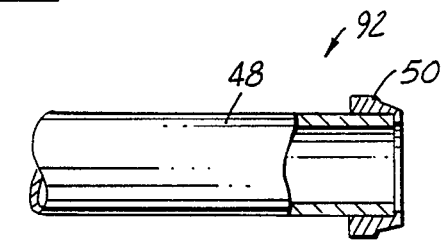

In operation, the pipe 48 and sleeve 50 (FIG. 8) components of end fitting 92 are first prepared and cleaned in the usual manner, with flux being applied evenly to both the inside and outside of sleeve 50 and the outside diameter of tube 48 adjacent to the end thereof. With appropriately sized inserts 32, 33 mounted in electrode elements 18, 20, the unbrazed end fitting is then positioned between the free ends of the electrode elements, and toggle clamps 38, 40 are activated so as to clamp sleeve 50 between opposed ends of the electrodes, and to clamp tube 48 between the other opposed ends of the electrodes. In this position, as best seen in FIG. 2, substantial portions of the peripheral surfaces (at least 180°) of both sleeve 50 and tube 48 are engaged by the opposed electrode insert surfaces.

With the unbrazed end fitting so positioned, timer-select switch 76 is positioned to apply current to the electrodes and end fitting for a time duration sufficient to heat the end fitting elements to suitable brazing temperature, and to maintain such temperature for a time sufficient to permit flow of brazing alloy around the fitting components. Such time durations will vary with component size—i.e., tube and sleeve diameters. Heating time duration for any standard tube/sleeve size combination may be empirically determined and specified in an operator's manual associated with the unit. Preset timers 1TR and 2TR are presently preferred, but either or both may be replaced by a programmable timer for greater versatility. In a working embodiment of the invention, the timers 1TR and 2TR apply heating current to the fitting joint for one minute and five minutes respectively.

With the timer so set, a heating cycle is started by depression of switch 74. The appropriate timer 1TR or 2TR is thus energized through switch 76, and instantaneous timer contacts are closed in parallel with cycle start switch 74 so that the latter may be released. In the meantime, timer 1TR or 2TR, both of which have dials positioned for viewing on the operator panel, time application of current through power transformer 30 to electrodes 18, 20 and to the end fitting joint clamped therebetween. Passage of current through the tube end sleeve fitting elements heats these elements between the electrode inserts. Sleeve 50 may be provided with a silver brazing ring, in which case uniform application of current and heat in accordance with the present invention automatically causes the brazing alloy to melt and flow uniformly around the fitting joint. Alternatively, silver solder or the like may be applied manually to the fitting joint after the joint has achieved suitable brazing temperature. After the selected timer 1TR or 2TR has timed out, the associated normally-closed timed contacts open so as to de-energize the timer, open the instantaneous contacts, and thereby remove power from the timer and from control relay 1CON. The normally open contacts 1CON-1 and 1CON-2 are thus opened so as to remove power from transformer 30 and electrodes 18, 20.

Figure 9:
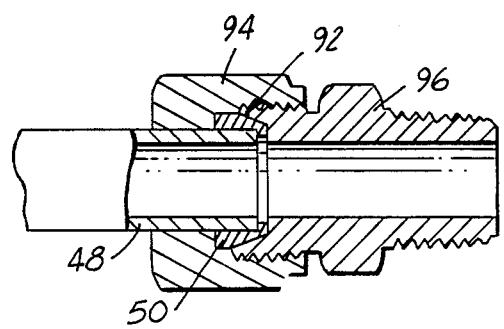
FIG. 9 is a fragmentary partially sectioned elevational view of the fitting in FIG. 8 sealingly clamped in a conduit coupling.

As previously noted, electrode inserts 32, 33 may be provided in differing sizes to accommodate differing tube and sleeve diameters. Likewise, inserts 32, 33 may be of differing materials selected to control and maintain heat distribution between the tube and sleeve fitting elements. For example, where sleeve 50 is of copper, it is preferred that the associated electrode inserts 32 be of stainless steel construction. Likewise, where tube 48 is of steel construction, it is preferred that the associated inserts 33 be of copper. Magnitude and time duration of current applied to heating electrodes 18, 20 are empirically selected to achieve acceptable braze joints. For example, it has been found that application of 2.5 VAC at 1500 amps for sixty seconds heats a tube 48 of 1.5" outside diameter and a sleeve 50 of 1.94" outside diameter to a temperature between 1500° F. and 1700° F. suitable for silver brazing. Increased current for a shorter time duration can lead to formation of scale at the fitting joint. Decreased current at a longer duration may be employed, but at reduced efficiency. An end fitting 92 brazed in accordance with the invention is illustrated in FIG. 9 clamped between coupling members 94, 96.

The invention claimed is:

1. Apparatus for heating a tube/sleeve end fitting for brazing comprising: a pair of electrodes, means for selectively bringing said electrodes into physical engagement with a tube sleeve end fitting with one of said electrodes in engagement with the fitting sleeve and the other of said electrodes in engagement with the tube closely adjacent to but spaced from the sleeve, means for selectively applying electrical current between said electrodes through the tube and sleeve to heat said tube/sleeve end fitting to elevated temperature sufficient for brazing, each of said electrodes comprising an opposed pair of electrode elements, and said elements of each said pair having arcuate portions contoured for external peripheral surface engagement with the tube and sleeve.

2. The apparatus set forth in claim 1 wherein one element of each of said pair is moveable with respect to the opposing element of each pair for removable insertion of a tube/sleeve end fitting therebetween.

3. The apparatus set forth in claim 2 further comprising means for selectively and releasably clamping a tube/sleeve end fitting between said elements.

4. The apparatus set forth in claim 3 wherein each said electrode element includes an insert removable mounted thereon, inserted of each said element pair bearing identical.

5. The apparatus set forth in claim 4 for heating a tube/sleeve end fitting that comprises a copper sleeve on a steel tube, wherein one said pair of electrode elements has copper insets constructed for external peripheral engagement with the tube, and the other said pair of electrode elements has stainless steel inserts constructed for external peripheral engagement with the sleeve.

6. The apparatus set forth in claim 3 wherein said electrodes comprises, opposed U-shaped members, one end of each member forming a corresponding said electrode element, and wherein said current-applying means comprises an electrical power transformer having primary and secondary transformer windings, said secondary windings being formed by said U-shaped members.

7. The apparatus set forth in claim 6 wherein said current-applying means further includes a timer and means for selectively actuating said timer so as to apply current to said primary winding for a preselected time duration.

8. The apparatus set forth in claim 7 wherein said timer includes means for selectively varying said time duration.

9. The apparatus set forth in claim 7 further comprising a wheeled cabinet containing said current-applying means, said electrodes projecting from one wall of said cabinet for selective engagement with a said tube/sleeve end fitting.

10. Apparatus for electrical resistance heating of a tube/sleeve end fitting for brazing that comprises:
a pair of substantially U-shaped electrodes each having longitudinally spaced free ends laterally opposed to the free ends of the other electrode, the laterally opposed end of said electrodes having opposite arcuate surface portions, with the surface portions on the free ends of each electrode being on a common axis,
means mounting at least one of said electrodes for lateral motion with respect to the other for moving the associated free ends toward and away from the free ends of the other electrode,
means for locking said at least one electrode in a position to clamp a tube/sleeve end fitting between said electrodes with the tube of said fitting clamped between one laterally opposed pair of said free ends in peripheral surface engagement with associated arcuate surface portions, and with the sleeve of said end fitting clamped between the other laterally opposed pair of said free ends in peripheral surface engagement with associated arcuate surface portions, and
means for applying electrical current to said electrode free ends such that said current travels through the end fitting clamped between said electrodes.

11. The apparatus set forth in claim 10 wherein said current-applying means comprising a power transformer including secondary windings formed by said electrodes and a primary winding magnetically coupled to said electrodes.

12. The apparatus set forth in claim 11 wherein said current-applying means further comprises a timer for applying current to said primary winding for a preselected time duration to raise temperature of the end fitting clamped between said electrodes to within a preselected range.

* * * * *